(12) United States Patent
Newns et al.

(10) Patent No.: US 6,984,846 B2
(45) Date of Patent: Jan. 10, 2006

(54) GRADIOMETER-BASED FLUX QUBIT FOR QUANTUM COMPUTING AND METHOD THEREFOR

(75) Inventors: Dennis M. Newns, Yorktown Heights, NY (US); David P. DiVincenzo, Tarrytown, NY (US); Roger H. Koch, Amawalk, NY (US); Glenn J. Martyna, Pleasantville, NY (US); Jim Rozen, Peekskill, NY (US); Chang Chyi Tsuei, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 10/648,346

(22) Filed: Aug. 27, 2003

(65) Prior Publication Data
US 2005/0045872 A1    Mar. 3, 2005

(51) Int. Cl.
*H01L 29/06* (2006.01)
(52) U.S. Cl. ............... 257/31; 257/33; 257/34; 257/36; 505/190; 505/193
(58) Field of Classification Search ............... 257/34, 257/35, 36, 31; 505/190, 193; 438/2
See application file for complete search history.

(56) References Cited

U.S. PATENT DOCUMENTS 6,605,822 B1 *   8/2003   Blais et al. ................ 257/34
6,784,451 B2 *   8/2004   Amin et al. ............... 257/34

OTHER PUBLICATIONS

Chiorescu, et al., "Coherent Quantum Dyamics of a Superconducting Flux Qubit", Mar. 21, 2003, Science, vol. 299, pp. 1869-1871.
Vion, et al., "Manipulating the Quantum State of an Electrical Circuit", May 3, 2002, Science, vol. 296, pp. 886-889.

* cited by examiner

*Primary Examiner*—Sara Crane
(74) *Attorney, Agent, or Firm*—Stephen C. Kaufman, Esq.; McGinn IP Law Group, PLLC

(57) ABSTRACT

A qubit (quantum bit) circuit includes a superconducting main loop that is electrically-completed by a serially-interconnected superconducting subloop. The subloop includes two Josephson junctions. A first coil provides a first flux that couples with the main loop but not with the subloop. A second coil provides a second flux that couples with the subloop but not with the main loop.

24 Claims, 2 Drawing Sheets

GRADIOMETER-BASED FLUX QUBIT FOR QUANTUM COMPUTING AND METHOD THEREFOR

U.S. GOVERNMENT RIGHTS IN THE INVENTION

The subject matter of the present Application was at least partially funded under the Grant No. MDA972-01-C-0052 from the U.S. Defense Advanced Research Projects Agency (DARPA).

BACKGROUND OF THE INVENTION

1. Field of the Invention

The present invention generally relates to a quantum computer. Specifically, a quantum bit (qubit) based on a gradiometer superconducting flux qubit design provides significant noise immunity and two independent input controls, one each for $S_x$ and $S_z$ fields.

2. Description of the Related Art

Relative to classical computers, a quantum computer potentially offers an enormous gain in the use of computational resources, including time and memory. Classical computers need exponentially more time or memory to match the computational power of a quantum computer when appropriate problems are addressed.

Experimental and theoretical research in quantum computation is accelerating world-wide. New technologies for realizing quantum computers have been proposed and continue to be further analyzed and improved.

The basic unit of quantum information in a quantum computer is a quantum two-state system, called a "quantum bit" ("qubit"). A qubit is a superposition of its two logical states 0 and 1. Thus, a qubit can encode, at a given moment of time, both 0 and 1.

An ideal hardware implementation of the qubit should be: 1) a controllable high-coherence (e.g., Q-factor, the time for which the wavefunction remains quantum-coherent, per unit time required to implement a qubit operation—of at least $10^5$) quantum 2-level system, and 2) scalable (i.e., many qubits, for example, $10^4$, can be manufactured and operated cheaply).

A key element in the search for practical quantum computer designs is finding an improved hardware implementation of the qubit. After successes with few-qubit systems, including demonstration of the Schor factorization algorithm with NMR (Nuclear Magnetic Resonance)-based techniques, further progress awaits development of scalable qubits. For example, existing qubit implementations (such as by NMR) have achieved limited success (such as demonstrating factorization of 15), but have run into limitations of non-scalability.

Using lithography, for example, manufacture of the thousands of similar qubits required in a practical quantum computer becomes feasible. One scalable approach being explored implements the qubit as a micron-scale superconducting circuit. Recently, superconducting implementations with a long coherence lifetime, approaching that required for realistic quantum computation, have been demonstrated.

For example, a type of superconducting Josephson-junction qubit has recently been shown to have a Q-factor of order $10^4$, which approaches that required in a quantum computer. Such qubits can be cheaply made in multiple copies on a chip by lithography, and are, therefore, scalable. However, the approach described is a charge qubit, whose states are defined in terms of the presence or absence of a single electron-pair, and, therefore, is likely to lack robustness for a commercial environment.

Thus, the conventional superconducting qubits have either involved a nanoscopic quantum dot, whose bistable state is defined by the presence/absence of a single electron pair, or operate in an intermediate regime where the defined state is a hybrid of charge and flux (sometimes termed a 'phase' qubit).

SUMMARY OF THE INVENTION

Given the potential delicacy of single electron pair-based devices in an engineering context, it is important at this initial stage of qubit development to explore potentially more robust designs. More specifically, in the flux qubit design, the approach taken in the present invention, the bistable state is defined by clockwise/anticlockwise circulation of currents in a superconducting ring (or, equivalently, the associated ↑- and ↓-polarity magnetic fluxes).

Such a qubit would have intrinsic robustness, as well as scalability and a high Q-factor.

So far, there has been no successful demonstration of a flux qubit. In addition to scalability, such devices would require very careful engineering design in order to satisfy the following criteria:

a) significant inter-state tunneling, which only occurs in a narrow parameter range;

b) high Q-factor (i.e., noise immunity);

c) controllability (i.e., two, preferably independent, input circuits);

d) readout capability; and e) analyzability.

Therefore, in view of the foregoing problems, drawbacks, and disadvantages of the conventional systems, it is an exemplary feature of the present invention to provide a structure for a qubit that is robust, scalable, and has a high Q-factor.

It is another exemplary feature of the present invention to provide a flux qubit structure in which a gradiometer design provides independent control of the $S_x$ and $S_z$ fields and possesses a degree of immunity to flux noise in both these fields.

To achieve the above and other exemplary features and advantages, in a first exemplary aspect of the present invention, described herein is a qubit (quantum bit) circuit including a superconducting main loop that is electrically-completed by a serially-interconnected superconducting subloop. The subloop preferably contains two Josephson junctions. A first coil provides a first flux that couples with the main loop, but not necessarily with the subloop. A second coil provides a second flux that couples with the subloop but not necessarily with the main loop.

In a second exemplary aspect of the present invention, described herein is a qubit (quantum bit) circuit including a superconducting main loop that is electrically-completed by a serially-interconnected superconducting subloop. The subloop contains two Josephson junctions. A noise immunity characteristic of the main loop is enhanced by selection of an operating point such that fluctations in flux affect an eigenvalue of a potential energy function of the main loop only to a second order. The noise immunity characteristic of the subloop is enhanced by forming the subloop in a shape such that a uniform field representing a noise is canceled out in the subloop.

BRIEF DESCRIPTION OF THE DRAWINGS

The foregoing and other exemplary features, purposes, aspects and advantages will be better understood from the following detailed description of exemplary embodiments of the invention with reference to the drawings, in which.

DETAILED DESCRIPTION OF AN EXEMPLARY EMBODIMENT OF THE INVENTION

Figure 1A:
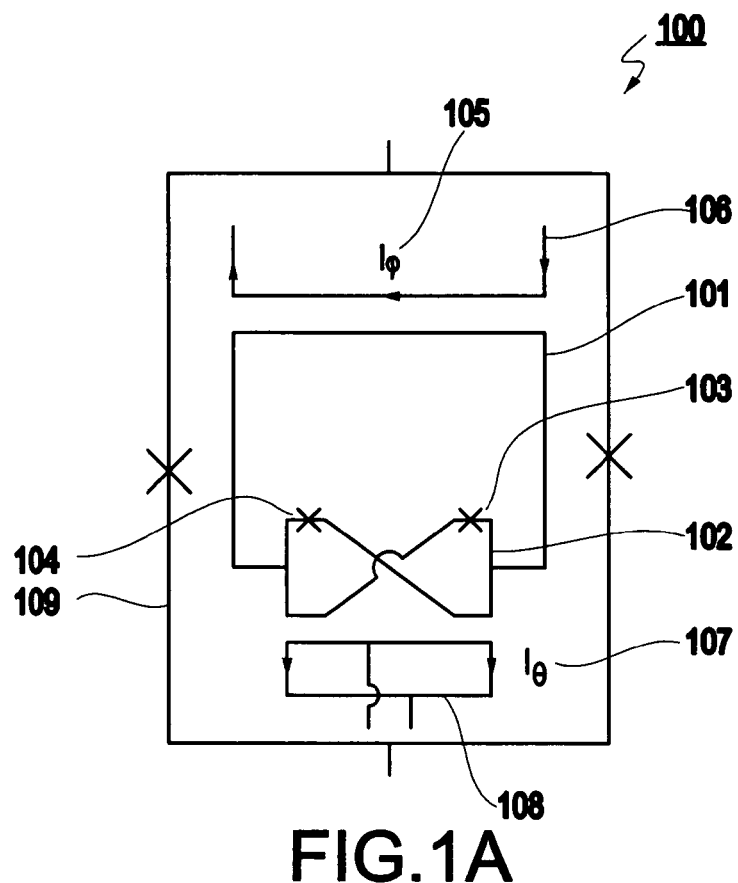
FIG. 1A shows an alternative exemplary embodiment in which a Josephson junction 110 is included in a main loop 101.
Figure 1B:
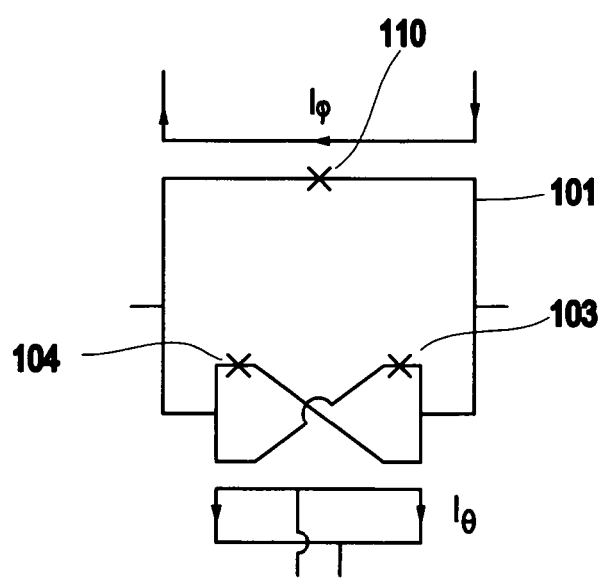
FIG. 1 is a basic circuit 100 that shows an exemplary embodiment of the present invention.
Figure 2:
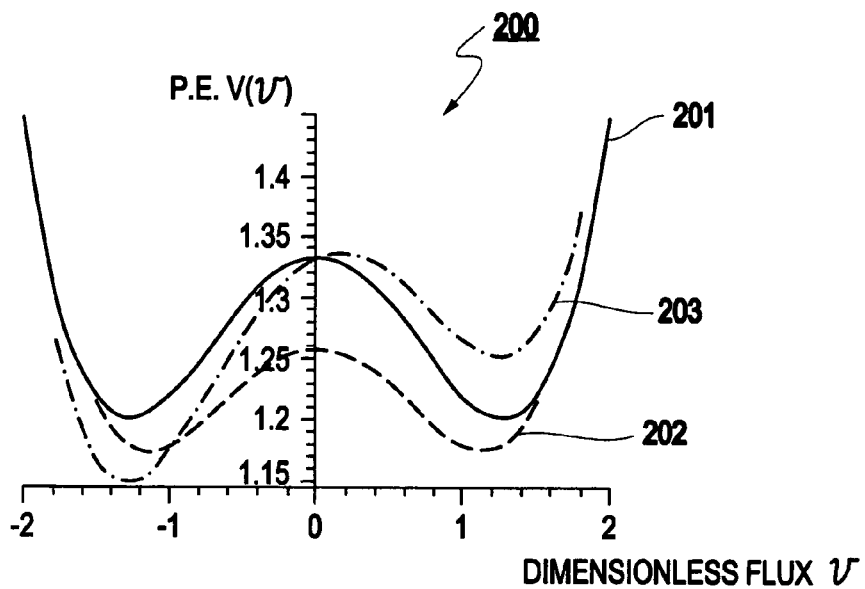
FIG. 2 shows the potential energy in the main ring c under influence of flux from current $I_\Phi$ in the upper z-drive coil 106 and under influence of flux from current $I_\theta$ in the lower x-drive coil 108.
Figure 3:
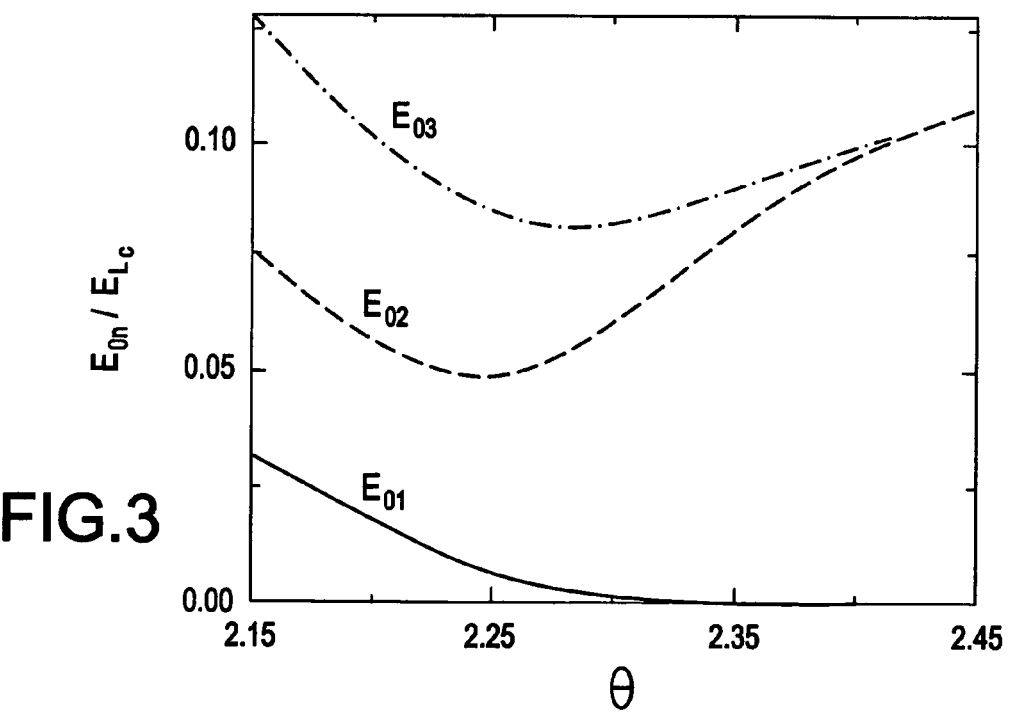
FIG. 3 shows the eigenvalue separations $E_{0n}$ in units $E_{Lc}$, between the ground state and the $n^{th}$ eigenvalue for the 2D Hamiltonian of Equation 3, plotted versus θ, and using the parameters as given in Table 1.

Referring now to the drawings, and more particularly to FIGS. 1–3, an exemplary embodiment of the present invention will now be described.

FIG. 1 shows a basic circuit 100, showing main loop 101 (also referred to herein as "main coil c" and "c-ring") and gradiometer subloop 102 (also referred to herein as "a-ring", "gradiometer loop", and "subloop"), containing two Josephson junctions 103, 104.

The materials for fabrication of the present invention are well known in the art of semiconductor technology. Thus, for example, the Josephson junctions could be fabricated using aluminum/aluminum oxide, and the conductive material for the loop and subloop could be aluminum, as is well known in the art.

Flux threading the main loop 101 is controlled by current $I_\Phi$ 105 in the upper z-drive coil 106, while flux threading the gradiometer loop 102 is controlled by current $I_\theta$ 107 in the lower x-drive coil 108. The flux in the main ring 101 is weakly coupled inductively to the surrounding SQUID (superconducting quantum interference device) 109, which operates classically, and which serves to provide an output signal from the qubit. The qubit is preferably operated at very low temperature (mK), at which the system is superconducting and quantum coherence can be maintained.

The Josephson junctions 103, 104 in series with the main loop 101, are nonlinear devices which, under operating conditions of correctly tuned static control fluxes, create a double-minimum potential energy surface which supports tunneling between the ↑- and ↓-flux states in the main coil 101. The tunneling barrier controls the rate of tunneling, a high barrier implying a very low or zero tunneling rate (when the main coil 101 flux state is fixed at ↑- or ↓-), and a low barrier implying a high tunneling rate (↑- and ↓-flux states are rapidly interconverted, forming a quantum mechanical superposition of the two flux states).

The tunneling barrier height is controlled by the flux threading the subloop 102, and thus is directly controlled by the current $I_\theta$ 107 in the lower x-drive coil 108. Hence the control current $I_\theta$ 107 directly controls the tunneling rate between ↑- and ↓-flux states, which can vary from GHz to negligible. The current $I_\Phi$ 105 in the upper z-drive coil 106 controls the relative height of the wells in which the ↑- and ↓-flux states sit, so that either the ↑- and ↓-flux state can be made selectively the more stable.

The qubit is initialized by selecting a control current $I_\Phi$ 105 in the upper z-drive so as to make one of the flux states, say, for the sake of discussion, the ↑-state, stable. After the system has settled into that state, the current $I_\theta$ 107 in the lower x-drive coil 108 is used to raise the tunneling barrier to inhibit tunneling, and then the control current $I_\Phi$ 105 is turned off. Now the system has a potential which is symmetric with respect to ↑- and ↓-fluxes, but is in the selected ↑-flux state.

Operation of the qubit requires adjusting the control current $I_\theta$ 107 so as to have a tunneling barrier low enough to permit tunneling (but, as discussed in further detail below, not so low as to destroy the qubit-type spectrum of two levels very close together). A sequence of single qubit control operations, in which current pulses of controlled duration are applied to the x-drive coil 108 and the z-drive coil 106, allows the quantum state (wavefunction) of the system to evolve in order to perform the quantum computation. In an actual quantum computer, there are many qubits and 2-qubit operations are also performed.

At the end of the computation, the quantum state is projected onto a classical ↑- or ↓-flux state, of which a statistical mixture will be obtained on averaging over many runs. The projection (or read) is done by using the control current $I_\theta$ 107 in the lower x-drive coil 108 to reduce the tunneling rate to zero, and then measuring the magnetic flux inside the SQUID ring 109 which operates classically as a standard SQUID device.

From the perspective of basic circuit analysis, a current $I_\Phi$ 105 in z-drive coil 106 will provide a flux that couples into main coil 101, and the coupled flux will tend to cause a current circulating in the main coil 101. This circulating current will produce a flux having ↑- and ↓-flux states in the main coil 101, as dependent upon the direction of the circulating current, and this main coil flux state can be detected by the surrounding SQUID 109.

Since subloop 102 is a serially-interconnected component in the main coil 101, the subloop 102 controls the current circulating in the main coil 101. As can be seen in FIG. 1, subloop 102 provides two parallel current paths to complete the circulating current path of the main coil 101, and each of the two subloop current paths includes a Josephson junction. The characteristics of the subloop 102 is controlled by the x-drive coil 108, which control will shortly be explained as providing control for the quantum tunneling barrier level present in the subloop 102, as modeled to be a circuit containing an equivalent single Josephson junction.

It is also noted that the lower x-drive coil 108 differs from the upper z-drive coil 106 in that current flows in parallel paths through the coil 108, rather than the serial path of coil 106.

Thus, this qubit design is a circuit including two superconducting rings 101, 102 with two Josephson junctions 103, 104. A characteristic immediately noticed in this design is that the smaller of the two rings has a "gradiometer twist", in which the ring 102 is twisted into a figure-eight conformation.

This figure-eight shape introduces spatial mirror-symmetry in the electric current configuration flowing in the ring, enabling current flows to be classified into "difference mode" and "common mode" types. This classification greatly simplifies analysis, achieving the above-identified criterion of analyzability. It is noted that the figure-eight shape of ring 102 could include more loops than shown in FIG. 1, as long as the configuration provides the difference and common mode classification noted above.

Additionally, external current loops (e.g., x-drive coil 108) can be designed which couple either to the difference or common modes, which greatly facilitates control and, thereby, achieves the controllability criterion. Moreover, the facile control shown by the lower x-drive coil 108 and easy analysis enables the device to be operated in the optimal tunneling regime, thereby achieving the criterion for significant inter-state tunneling.

Common mode flux noise is eliminated from the smaller ring 102, by far the more sensitive of the two rings for a reason to be explained later, thereby helping to achieve the criterion for high Q-factor and low noise. It should be noted that noise immunity of main ring 101 could likewise be improved, if desired, by likewise forming it into a figure-eight twisted shape. Such alternate configuration for the main loop 101 is not shown in FIG. 1, for simplicity.

Finally, the differential mode is used to make the interwell barrier very large, so tunneling stops and the system is locked into one or the other flux state, when flux threading it can be measured by the SQUID (superconducting quantum interference device) circuit 109 in the standard manner, thereby achieving the above-identified criterion for readability.

The current $I_\Phi$ in the upper z-drive coil 106 produces a flux surrounding the z-drive coil 106, which flux couples to the main coil 101. Current $I_\Phi$ in the z-drive coil 106, therefore, serves as a first control $S_z$. This flux from z-drive coil 106 does not couple appreciably to the gradiometer coil 102, not only because of distance but primarily because of the inherent cancellation effect of the figure-eight shape.

Similarly, the parallel current paths of the lower x-drive coil 108 causes the current $I_\theta$ in the x-drive coil 108 to provide a flux which interacts only with the gradiometer coil 102 (again, because of the figure-eight shape of the gradiometer coil 102). That is, the opposite directions of current in the two parallel current paths of the x-drive coil 108 cancel in coupling with the main coil 101.

Since the flux from the upper z-drive coil 106 essentially does not couple into the gradiometer loop 102, and the flux from the lower x-drive coil 108 essentially does not couple into the main coil 101, an advantage of the flux qubit design of the present invention is that these two input fields $S_x$ (e.g., from lower x-drive coil 108) and $S_z$ (e.g., from upper z-drive coil 106) can be considered as two control inputs that are independent from each other.

Therefore, the gradiometer flux qubit design exemplarily shown in FIG. 1 provides the following advantages over conventional qubit designs in that:

a) it provides independent control of the $S_x$ and $S_z$ fields, which will shortly be explained as meaning that the $S_x$ input provides a control of barrier tuning which is independent of the biasing effect of the $S_z$ field, and b) there is a degree of immunity to flux noise in both of these fields $S_x$ and $S_z$.

In more detail, the gradiometer flux qubit circuit shown in FIG. 1 includes a main loop 101 and gradiometer subloop 102 containing two Josephson junctions 103, 104. The subloop 102 forms an interferometer and acts as a single effective junction whose Josephson critical current is controlled by the flux threading the subloop 101.

The usefulness of the gradiometer loop 102 derives from a common electrical engineering design principle in which common mode currents are decoupled from differential mode currents. In the exemplary design, the common mode current flows around the main loop 101 and is equally partitioned into branches flowing through the two sides of the subloop 102. The differential mode current circulates only around the subloop 102. By symmetry, there is no mutual inductance between differential and common mode currents.

For the same reason, flux $\Phi_c$ threading the main loop 101 is coupled only to current $I_\Phi$ flowing in the upper drive coil 105, while flux $\Phi_a$ threading the gradiometer subloop 102 is coupled only to current $I_\theta$ in the lower drive coil 108. These two fluxes $\Phi_a$ and $\Phi_c$ represent the $S_x$ and $S_z$ qubit controls respectively, so that independent control via the two currents $I_\theta$ and $I_\Phi$ has been achieved in this exemplary design shown in FIG. 1. Flux noise in the subloop 102 is also significantly reduced since only spatially varying flux can couple thereto, a reduction which will additionally be enhanced by using a small-diameter subloop 102.

FIG. 1A shows a second embodiment in which Josephson junction 110 is included in the main loop 101. In this alternative design, the measurement of the state of the qubit, instead of being performed by the external SQUID, is performed internally. The additional junction 110 has critical current similar to that of the other junctions 103, 104. When the control $I_\theta$ is adjusted so as to raise the potential barrier to the maximum, then the quantum state of the system is frozen.

The two external current leads can now be used to operate the circuit as a classical SQUID, when its state can be determined. In normal, quantum operation, the circuit can be analyzed similarly to the two-junction circuit and its behavior is essentially the same.

One problem in designing a flux qubit is the difficulty in getting quantum coherent tunneling, essential to qubit operation, between ↑- and ↓-oriented fluxes, due to their heavy effective mass. Tunneling can be enhanced if the barrier between opposite-sense flux states is lowered by an interferometrically-tuned Josephson junction. Barrier tuning can also be naturally a part of the solution to providing single-qubit control.

Qubit control of the exemplary flux qubit in FIG. 1 involves applying external signals driving two types of Pauli spin operators in the two-level qubit subspace, here the operators $S_x$ and $S_z$. In the subspace of ↑- and ↓-oriented fluxes, a perturbation in the tunnel barrier is an $S_x$-type operator, while $S_z$ represents a magnetic field splitting the degeneracy of the ↑- and ↓-flux states. Hence, barrier control, being $S_x$-type, can be integrated with the qubit control system.

The flux qubit also preferably includes design features minimizing external flux noise, which destroys the quantum coherence essential for qubit operation. The successful flux qubit then should incorporate the design features of barrier tuning, two-field qubit control, and minimal external flux noise.

It will shortly be described in detail that, by selecting the operating point, the effect of flux noise in the main loop 101 can also be minimized. A purpose of the surrounding SQUID, which operates classically and has a weak inductive coupling to the main loop 101 flux, is to read out the state of the qubit.

To see how some of these exemplary concepts work out in more detail, the primary variables in which to express the Hamiltonian for the system of FIG. 1 are the junctions' Josephson phases x and y, or pair "pseudomomenta", which relate to flux quanta via gauge invariance, and their conjugate variables $i^{-1} \partial/\partial x$ and $i^{-1} \partial/\partial y$ which relate to pair number.

Assuming two equal junctions with the same capacitance C and Josephson energy $E_J$, the kinetic energy K.E., originating in the capacitative charging energy, is K.E.$=-(2e)^2[\partial^2/\partial x^2+\partial^2/\partial y^2]/2C$ where e is electronic charge. The potential energy of the junctions is P.E.$=-E_j[\cos x+\cos y]$.

However, the inductive energy is not written simply in these terms, and instead, new common mode and differential mode variables, v and u respectively, will be worked with, defined as $$v = \frac{x+y}{2}; u = x - y. \quad \text{(Eqn. 1)}$$

In terms of v and u, the inductive energy is simple, and the whole Hamiltonian may be expressed as Equation 2 below:

$$\mathcal{H} = -\frac{(2e)^2}{2C}\left(\frac{1}{2}\frac{\partial^2}{\partial v^2}+2\frac{\partial^2}{\partial u^2}\right)+ \quad \text{(Eqn. 2)}$$
$$\frac{u^2}{2L_a}\phi_1^2 + \frac{v^2}{2L_c}\phi_1^2 - 2E_J\cos(v-\varphi)\cos\left(\frac{u}{2}-\theta\right),$$

Here, $L_a$ is the inductance of the a-ring (e.g., sub-loop 102), $L_c$ is the inductance of the c-ring (e.g., main loop 101) with current passing through the a-ring in common mode, $\Phi_c = \Phi\phi_1$ and $\Phi_a = \theta\phi_1$ are the external magnetic fluxes threading the c- and a-rings respectively, and $\phi_1 = h/2e$ is the (flux quantum/$2\pi$).

It is convenient to work with the dimensionless form, $H/E_{Lc}$, where $E_{Lc}$ is the inductive energy $E_{Lc} = \phi_1^2/L_c$, giving $$\mathcal{H}/E_{Lc} = \quad \text{(Eqn. 3)}$$
$$-\frac{1}{M}\left(\frac{1}{2}\frac{\partial^2}{\partial v^2}+2\frac{\partial^2}{\partial u^2}\right)+\frac{u^2}{2}\left(\frac{L_c}{L_a}\right)+\frac{v^2}{2}-\beta_c\cos(v-\varphi)\cos\left(\frac{u}{2}-\theta\right),$$

where $\beta_c = 2E_J/E_{L_c}$ is a dimensionless $I_cL_c$ product (critical current $I_c = E_J/\phi_1$; note that the combined junction is used in defining $\beta_c$), M is the dimensionless effective mass $M=2r_Q^2C/L_c$ (again the combined capacitance is used in defining M), and $r_Q = h/(2e)^2 = 1.03$ k$\Omega$ is a quantum of resistance.

As mentioned above, putting realistic values into the expression for the effective mass M (e.g. see Table I below), leads to values in the tens or hundreds, making the usual solution to Equation 3 just a classical one, with none of the tunneling dynamics essential for qubit operation.

The Hamiltonian, Equation (3), can be further simplified for purposes of gaining intuitive understanding. Typically, $L_c \gg L_a$, since the subloop is made much smaller than the main loop (e.g., a ratio of approximately 10 or more). Then the large coefficient of the $u^2$ term constrains the differential mode variable u to be small, and Equation 3 can be approximated by the single variable model:

$$\mathcal{H}/E_{Lc} = -\frac{1}{2M}\frac{\partial^2}{\partial v^2}+\frac{v^2}{2}-\beta_\theta\cos(v-\varphi), \quad \text{(Eqn. 4)}$$

where $\beta_\theta = \beta_C \cos\theta$ is the effective $I_cL_c$ product, taking into account the interferometer effect which enters as the $\cos\theta$ factor.

Equation 4 is now a single effective junction model, where the external flux $\Phi_a = \theta\phi_1$, driven by the x-drive current $I_\theta$, controls the effective junction.

This control allows the potential energy V (v)

$$V(v) = \frac{v^2}{2} - \beta_\theta\cos(v-\varphi), \quad \text{(Eqn. 5)}$$

to have a low interwell barrier, permitting significant tunneling to occur.

Provided $\beta_c > 1$, the potential energy V (v) in Equation 4 can have the twin-well shape required for a flux qubit (FIG. 2) under two sets of conditions:
1. $0 < \theta < \theta_c$, $\Phi$ in the neighborhood of $\pi$, and
2. $\pi-\theta_c < \theta < \pi$, $\Phi$ in the neighborhood of 0, where the critical value $\theta_c$ for classical twin wells to exist is given by $$\beta_c \cos\theta_c = 1. \quad \text{(Eqn. 6)}$$

Plots 200 of the potential energy (PE), assuming the second of these operating regions, in FIG. 2 show the effects of the control fields on the PE surface. The following will be assumed as being confined to this second region.

Reducing $\theta$ slightly, significantly reduces the PE barrier between the two wells in FIG. 2 (compare full curve 201 and dashed curve 202). This is the $S_x$-like perturbation produced by the independent control current $I_\Phi$.

Increasing $\Phi$ slightly from zero splits the degeneracy (compare full curve 201 and dot-dashed curve 203) between the two wells representing classical ↑- and ↓-oriented magnetic fluxes. This is the $S_z$-like perturbation produced by the independent control current $I_\Phi$ (from the upper z-drive coil 105).

FIG. 2 shows the single variable potential V (v) in Equation 5 with parameters: full curve, $\theta=2.3$, $\Phi=0$; dashed curve, $\theta=2.25$, $\Phi=0$; dot-dashed curve, $\theta=2.3$, $\Phi=0.04$.

The barrier reduction, which is important to flux qubit operation, in this model can be seen even more clearly by introducing scaling ideas, which become valid just around the vanishing point of the interwell barrier, where the flux qubit operating point necessarily lies.

Assuming that the above is so, the PE can be expanded around $v=0$, when the effect of barrier reduction can be absorbed into the mass, enabling a description in terms of a single reduced mass $m^*$.

The Hamiltonian is expressed in terms of a reduced Hamiltonian with a quartic PE $h(m^*)$ $$\mathcal{H}/E_{Lc} = \frac{3}{2M^{2/3}}h(m^*), \quad \text{(Eqn. 7)}$$

$$h(m^*) = \left(\frac{m^*}{9}\right)^{2/3}\left[-\frac{1}{2m^*}\frac{\partial^2}{\partial s^2}-2s^2+s^4\right],$$

where the reduced mass is defined by $$m^* = 9(\beta_\theta - 1)^3 M. \quad \text{(Eqn. 8)}$$

In the formula (Equation 8) for the reduced mass, the combined effects can be seen of both the original mass M, and the barrier reduction factor $(\beta_\theta - 1)$, entering in a manner which merges their original identities. It seems that theoretically, an original mass of any magnitude can be compensated out by taking $\beta_\theta \to 1$, provided the $I_\theta$ current is stable and the flux noise threading the subloop is small enough.

A formula found to roughly reproduce the tunneling energy level splitting $E_{01}$ between the ground and first excited states for symmetric wells, derived from solving the Schrodinger Equation 7, is $$\frac{E_{01}}{E_{L_c}} \simeq 9(\beta_\theta - 1)^2 e^{-6\sqrt{(\beta_\theta - 1)^3 M}} \qquad \text{(Eqn. 9)}$$

From Equation 9, it can be seen that the barrier reduction factor $(\beta_\theta - 1)$ enters exponentially into the tunneling splitting. Thus, the scaling approach leads to an approximate understanding of the effect of varying $\theta$ on enhancing tunneling, in analytic terms.

Having gained some semi-quantitative understanding from Equations 7–9, some values of tunneling splitting may be expected quantitatively. That is, returning to the dimensionless Schrodinger Equation 3, and solving for the lowest few eigenvalues $E_n$ $$H\Psi_n = E_n \Psi_n; \; n=0, 1, 2, \ldots,$$

$\Psi_n(v,u)$ being the wavefunction, obeying the boundary conditions $$\Psi_n(\pm\infty, \pm\infty) = 0.$$

The parameters chosen are specified below in Table I. The wells are degenerate, and only the barrier-tuning $S_x$-type field $\theta$ is varied.

TABLE 1

Parameters used in Eigenvalue Calculation

| Parameter | $L_c$ | $E_{L_c}/h$ | 2C | M | $I_c$ (perJ'n) | $\beta_c$ | $\theta_c$ | $\phi$ |
|---|---|---|---|---|---|---|---|---|
| Value | 750 pH | 218 GHz | 46fF | 64 | 0.44 $\mu$A | 2 | 2.094 | 0 |

The results are seen in FIG. 3, which is drawn for a range of $\theta$ slightly exceeding the value $\theta_c = 2.09$ for disappearance of the classical double well, i.e., in the region where twin PE wells exist, but where the barrier is tunable to be relatively small. On the left side of FIG. 3, $\theta$ lies close to critical value $\theta_c$, and the energy levels approach the equal spacing characteristic of the harmonic oscillator (i.e., little sign of the twin well structure is present). Harmonic oscillator levels are inappropriate for the qubit application. On the right side of FIG. 3, the levels are in degenerate pairs, $E_0 = E_1$, and $E_2 = E_3$, as the barrier is now too high and all communication between the two wells is cut off.

In an intermediate region (e.g., around $\theta = 2.25$), the tunneling splitting, while remaining significantly less than the energy gap to the next highest levels, is large enough to be measurable conveniently with GHz technology (i.e., at $\theta = 2.25$ the splitting $E_{01} = 1.4$ GHz). The relatively narrow range of $\theta$ over which the desired characteristics of the eigenvalue spectrum hold (FIG. 3) should be noted. This is characteristic of the tuned junction solution to the flux qubit tunneling problem. The eigenvalue splittings in FIG. 3 illustrate how the tuned junction approach can lead to an eigenvalue spectrum appropriate for qubit operation of the FIG. 1 device.

A property is also mentioned, that the eigenvalue spectrum is an even function of the field $\Phi$ around the symmetric operating point $\Phi = 0$, conferring some resistance to noise present in the large c-coil 101. However, the physical form of this coil 101 should also be designed to reduce noise from external flux threading it.

In summary, the gradiometer design allows a convenient flux qubit implementation embodying tunneling barrier reduction via the tuned junction technique.

There are two external current coils, one coil 108 having a current $I_\theta$, which acts like the operator $S_x$ on the qubit and also enables tuning of the tunneling barrier (Equations 7–9 and FIGS. 2 and 3), and the other coil 106 having a current $I_\phi$, which acts like the operator $S_z$ on the qubit and breaks the degeneracy of the $\uparrow$ and $\downarrow$ flux states (Equation 5 and FIG. 2).

The independent control of these two variables is largely due to the gradiometer design. A second, more familiar feature provided by the gradiometer, is a degree of noise immunity in the $\theta$-field from the inability of a uniform noise field to thread the subcoil 102. That is, only a non-uniform field can act on the coils, and even its effect can be reduced by making the subcoil 102 diameter very small. Commonly, this is achieved by having the ratio of diameters of the main coil 101 and 102 to be approximately 10 or more.

Finally, a degree of noise immunity in the $\Phi$-field in the main coil 101 is conferred by the operating point, where fluctuations in $\Phi$ only affect the eigenvalues to second order.

As described above, these exemplary aspects of the gradiometer approach in the flux qubit design of the present invention provide substantial advantages over other flux qubit designs currently known.

While the invention has been described in terms of exemplary preferred embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A qubit (quantum bit) circuit, comprising:
    a superconducting main loop serially-interconnected with a superconducting subloop, said subloop including two Josephson junctions;
    a first coil providing a first flux that couples with said main loop but not with said subloop; and
    a second coil providing a second flux that couples with said subloop but not with said main loop.

2. The qubit circuit of claim 1, further comprising:
    a superconducting quantum interference device (SQUID) surrounding said main loop and said subloop,
    said SQUID being inductively coupled to said main loop and indicating a state of said main loop as an output signal of said qubit circuit.

3. The qubit circuit of claim 1, wherein said subloop includes at least one of a twisted, figure-eight shape and a predetermined diameter to achieve a common-mode noise-immunity characteristic.

4. The qubit circuit of claim 1, wherein said main loop includes at least one of an operating point for said main loop and a shape for said main loop as being a twisted, figure-eight shape, to provide a common-mode noise-immunity characteristic of said main loop.

5. The qubit circuit of claim 1, wherein said first coil comprises a single loop of conductive material providing a current path for a current serving as a first control input signal.

6. The qubit circuit of claim 1, wherein said second coil comprises a loop of conductive material interconnected to provide a parallel current path for a current serving as a second control input signal.

7. The qubit circuit of claim 1, wherein said subloop includes a shape for canceling an effect of said first flux in said subloop, such that said first flux does not couple into said subloop.

8. The qubit circuit of claim 1, wherein said second coil includes a shape for canceling an effect of said second flux in said main loop, such that said second flux does not couple into said main loop.

9. The qubit circuit of claim 1, wherein said subloop selectively tunes an operating point of said qubit circuit.

10. The qubit circuit of claim 7, wherein said shape of said subloop comprises a figure-eight.

11. The qubit circuit of claim 8, wherein said shape of said second coil comprises a parallel current path for a current traveling therein.

12. The qubit circuit of claim 1, further comprising:
a Josephson junction in said main loop.

13. A qubit (quantum bit) circuit, comprising:
a superconducting main loop serially-interconnected with a superconducting subloop, said subloop including two Josephson junctions,
wherein a noise immunity characteristic of said main loop is enhanced by selection of an operating point such that fluctuations in flux affect an eigenvalue of a potential energy function of said main loop to a second order.

14. The qubit of claim 13, wherein a noise immunity characteristic of said subloop is enhanced by said subloop having a predetermined shape such that a uniform field representing a noise is canceled in said subloop.

15. The qubit circuit of claim 13, further comprising:
a first coil providing a first flux that couples with said main loop but not with said subloop.

16. The qubit circuit of claim 15, further comprising:
a second coil providing a second flux that couples with said subloop but not with said main loop.

17. The qubit circuit of claim 13, further comprising:
a superconducting quantum interference device (SQUID) surrounding said main loop and said subloop, said SQUID being inductively coupled to said main loop to indicate a state of said main loop as an output signal of said qubit circuit.

18. The qubit circuit of claim 13, wherein said subloop includes a figure-eight shape.

19. The qubit circuit of claim 13, wherein said subloop selectively tunes an operating point of said qubit circuit.

20. The qubit circuit of claim 14, wherein said shape of said second coil comprises a parallel current path for a current traveling therein.

21. A method of forming a qubit, said method comprising:
forming a main loop, said main loop including a subloop twisted in a figure-eight shape and having two Josephson junctions;
forming a first drive coil sufficiently adjacent to said main loop to couple a first input signal flux into said main loop; and
forming a second drive coil sufficiently adjacent to said subloop to couple a second input signal flux into said subloop.

22. The method of claim 21, wherein said second drive coil includes a closed loop shape that provides a parallel conductive path for a current of said second input signal.

23. A qubit (quantum bit) circuit, comprising:
a superconducting main loop; and
a superconducting subloop interconnected with said main loop, said subloop including two Josephson junctions,
said subloop having a characteristic that a uniform external magnetic field is canceled out in said subloop.

24. A qubit (quantum bit) circuit, comprising:
a superconducting main loop; and
a superconducting subloop interconnected with said main loop, said subloop including two Josephson junctions,
wherein said main loop is controlled by a first control signal that does not couple to said subloop and said subloop is controlled by a second control signal that does not couple to said main loop.

* * * * *

UNITED STATES PATENT AND TRADEMARK OFFICE
CERTIFICATE OF CORRECTION

PATENT NO. : 6,984,846 B2 Page 1 of 1
APPLICATION NO. : 10/648346
DATED : January 10, 2006
INVENTOR(S) : Dennis M. Newns et al.

It is certified that error appears in the above-identified patent and that said Letters Patent is hereby corrected as shown below:

Column 1, lines 8-9, delete:

"The subject matter of the present Application was at least partially funded under the" and insert:

--This invention was made with Government support under--...;

Column 1, line 11, after "(DARPA).", insert

--The Government has certain rights to this invention.--

Signed and Sealed this

Third Day of April, 2007

JON W. DUDAS
*Director of the United States Patent and Trademark Office*